Oct. 21, 1952　　　　L. VERDEROSA　　　2,614,890
SAFETY DISK WHEEL
Filed April 13, 1949

INVENTOR.
LOUIS VERDEROSA
BY Nicholas J. Garofalo
his ATTORNEY

Patented Oct. 21, 1952

2,614,890

UNITED STATES PATENT OFFICE 2,614,890

SAFETY DISK WHEEL

Louis Verderosa, Ozone Park, N. Y.

Application April 13, 1949, Serial No. 87,210

2 Claims. (Cl. 301—38)

My invention relates to auxiliary motor vehicle wheels, and pertains particularly to a safety disc wheel.

I feel a safety wheel such as I have invented to be very much needed in the present motor vehicle world because of the considerable waste of time and money, the destruction of tires and tubes, and the injury and loss of life brought about by flat tires. This frightening loss can and should be prevented by means of a safety wheel that is practical and at all times capable of preventing the disastrous results flowing from a flat tire.

I have for a long time recognized the destructive and wasteful nature of flat tires, and I have taken proper steps to remedy the situation. For, I have invented a practical safety disc wheel. It is called a practical safety wheel because its ultimate purpose is to avoid and protect against the happening of the wasteful results brought about by flat tires. My wheel is economical to manufacture, can be used without difficulty or inconvenience, and is attractive in appearance.

My invention is a metal wheel that is carried on the axle alongside of the regular wheels and is attachable to the conventional motor vehicle securing bolts. My safety wheel will enable those experiencing a flat tire on the road to reach a service station or home in safety; it will prevent overturning of cars and loss of life or injury occasioned by blow outs; it will make unnecessary riding on a flat tire with the resulting destruction of the tire and inner tube; it will enable trucks loaded with heavy materials from turning over, bogging down, or becoming stranded on distant jobs because of a flat tire.

Generally the object of my invention is to provide a safety wheel that will automatically take over the burden and weight of a motor vehicle after the wheel required for that purpose has become disabled.

Another object of my invention is to produce an auxiliary safety wheel attachable to the conventional wheel securing bolts of a motor vehicle.

A further object of my invention is to produce an attractive safety wheel attachable to the conventional wheel securing bolts, which wheel will not only aid in carrying its portion of the weight of the vehicle but which will also prevent destruction of the deflated tire.

Another and more specific object of my invention is to provide a safety disc wheel which is smaller in diameter than the conventional motor vehicle wheel in conjunction with which it will be carried, which is attachable to the conventional wheel securing bolts, which is attractive in appearance, and which will not only aid in carrying the weight of the vehicle upon deflation of the regular tire but will also prevent destruction of such regular tire.

Other objects and advantages as well as the structural details of my invention will be apparent from the following detailed description when it is read in conjunction with the accompanying drawings wherein a preferred form of my invention is embodied.

Figure 1:
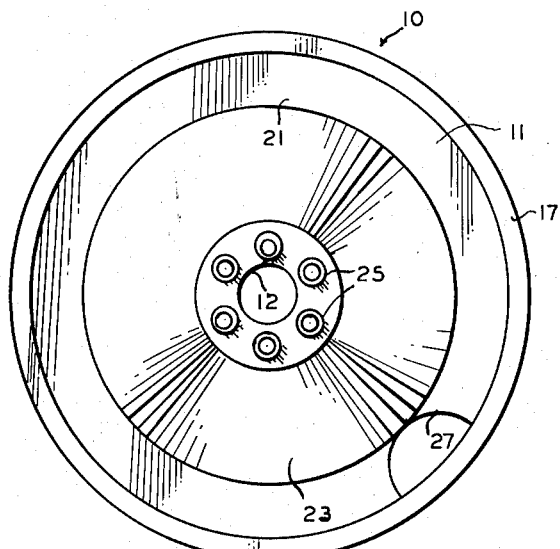
Fig. 1 is a plan view of the outboard face of the wheel.

Now, describing my invention in further detail, the wheel 10 comprises a general body portion 11, with a central opening 12. This central opening is adapted to receive therethrough the hub 13 of a motor vehicle axle. About this central opening there is an annular series of holes 14. These holes are adapted for receiving the conventional bolts 15 that are used for securing the usual wheel 16 on to the motor vehicle. The circumference of the body portion terminates in a band or T-like rim 17. This band is slightly rounded on its road contacting surface 18. It is preferable that the angles 19, 20, formed on either side of the body portion 11 where the body portion joins with the rim be unfilled so as to keep the weight of the wheel 10 as light as possible. The outer edge portion 21 of the wheel is disposed substantially at right angles to the center of the rim 17. The inner section 22 of the body portion disposed about the central hub opening 12 is concaved or dished. The convexed or opposite side 23 of the body portion is preferably slightly outboard of the outer edge 24 of the rim. On this outboard face or convexed side of the body portion there is a series of bosses 25 provided with openings aligned with the bolt receiving holes 14. This convexed side faces the regular wheel 16 when my safety wheel is in position on the motor vehicle. These bosses 25 are desired as they space the safety wheel 10 a slight distance from the regular wheel 16. This spacing aids in permitting dirt that may accumulate between the safety and regular wheels to be easily cleaned out, but more important such spacing allows for limited side expansion of the deflated tire 26. Such side expansion occurs when the deflated tire contacts the roadsurface. The spacing may, if necessary, be increased by the addition of space washers, not shown, between the bosses 25 and the regular wheel 16.

A suitable opening 27 is provided in the body portion 11 to allow access to the air valve of the adjacent regular wheel tire 26.

The road contacting surface 18 of the rim 17 is as said above slightly rounded, and is preferably untired. A thin hard rubber tire 28 may be used if desired. However, for best results to maintain lightness of the wheel and for practicability it is best that the rim of my wheel be untired.

Figure 3:
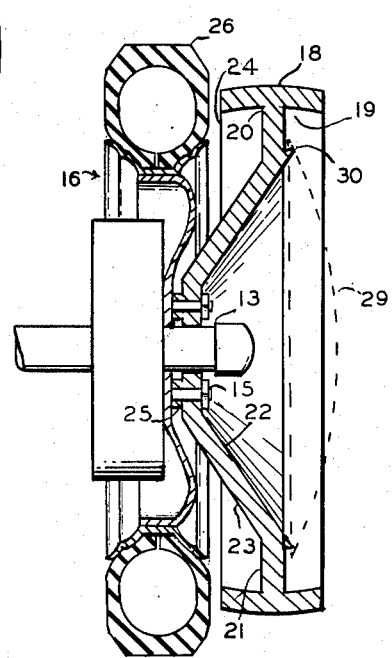
Fig. 3 is a vertical cross section of Fig. 2 taken on the line 3—3, and shows the relation of my invention to the regular wheel of a motor vehicle.
Figure 2:
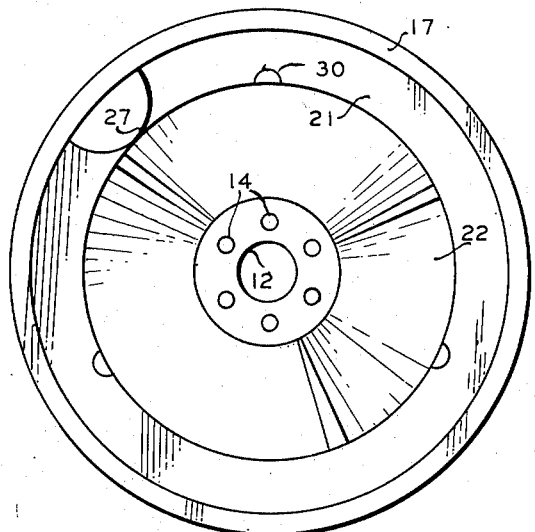
Fig. 2 is a plan view of the dished or concaved face of the wheel.

My wheel is of sturdy metal construction, and may be adapted for use with passenger cars, trucks, busses, and other motor vehicles. In the use of my safety wheel, particularly on passenger motor vehicles, the concaved face 22 of the body portion may be decoratively coated or covered. The concaved face is the exposed side of the safety wheel when it is in position on the motor vehicle. This face may be coated with chrome, nickel, aluminum, or some other bright or stainless metal coating. Again, this exterior face of the wheel may be suitably painted, or the edge section 21 near the rim may be painted and the central portion 22 may be of a bright metal finish. A suitable hub cap 29 shown in dotted lines in Fig. 3 may be combined with the wheel to cover all or a portion of the concaved face 22. The hub cap may be adapted to be secured to nubs or raised projections 30 on the face of the wheel, or it may be secured to the wheel in any other manner such as by spring clips fastened to the wheel.

When secured to the motor vehicle my safety wheel 10 does not contact the ground except when the regular wheel has become deflated. This is because the diameter of the safety wheel is smaller than that of the regular wheel with which it is to be used. The safety wheel is not intended to contact the ground except when the regular tire is all or substantially deflated. A reasonable difference in diameter is desired between that of the safety wheel and that of the regular wheel to allow for the bounce and consequent depression of the inflated tire, such as occurs in riding over bumps and road holes. Best results are obtained when the diameter of the safety wheel is approximately three inches less than that of the regular wheel with which it will be used. When such is the difference in diameters the resiliency and bounce of the inflated tire is not lost.

When the inflated tire of the regular wheel becomes deflated the burden carried by such wheel will be transferred over to and carried by the safety wheel 10. The extent to which the deflated tire flattens as it contacts the road surface will be limited by the diameter of such safety wheel, and where the diameter of such wheel is approximately three inches less than that of the regular wheel the limited flattening of the deflated tire that occurs will not injure or crack the tire walls.

Above I have described in detail a preferred form of my invention, however, it is my intent to include within the coverage of this specification all forms and modifications which may reasonably be included within the spirit and scope of the invention as well as within the reasonable interpretation of the appended claims.

What I claim is:

1. An auxiliary wheel of the character described to be used in association with a regular wheel of a motor vehicle and adapted to support the vehicle upon deflation of the regular wheel tire, the auxiliary wheel comprising in combination a main body section having a convexed central portion, a rim about the periphery of the body section, the rim being substantially flat and extending laterally from both sides of the body section, the body section having an axial opening for receiving the end portion of the regular wheel axle and having an annular series of holes about the axial opening for receiving the conventional wheel securing bolts of the vehicle, a series of bosses on the convexed face of the body section so arranged as to keep the rim of the auxiliary wheel spaced a distance from the regular wheel tire in order to allow for side expansion of the regular wheel tire on bouncing, the laterally extended rim serving to allow for spread thereunder of the expanded tire upon substantial deflation thereof, and the laterally extended rim further serving to spread the weight of the vehicle over a greater area when the vehicle is supported by the auxiliary wheel, the main body section having a flat marginal portion intermediately of the rim and the convexed portion, this flat portion serving to center the weight borne by the rim portion, this flat portion also having an opening allowing access to the air valve of the regular wheel tire, the opposed face of the convexed portion of the auxiliary wheel being concaved, nubs integral with the concaved face of the body section and adapted for securing a hub cap thereto whereby dirt may be sealed from the axle end of the regular wheel, and the diameter of the auxiliary wheel being less than that of the regular wheel so that the weight of the vehicle is not borne by the auxiliary wheel except upon substantial deflation of the regular wheel tire.

2. An auxiliary wheel as in claim 1 wherein the diameter of the auxiliary wheel is approximately three inches less than that of the regular wheel whereby flattening of the regular wheel tire before the rim of the auxiliary wheel contacts the roadway is allowed only to that extent which will not damage the tire walls.

LOUIS VERDEROSA.

REFERENCES CITED

The following references are of record in the file of this patent:

UNITED STATES PATENTS

| Number | Name | Date |
| --- | --- | --- |
| D. 79,005 | Ambrose | July 23, 1929 |
| 1,523,132 | McGowan | Jan. 13, 1925 |
| 1,667,820 | Reinsberg et al. | May 1, 1928 |
| 2,336,959 | Redman | Dec. 14, 1943 |
| 2,447,428 | O'Leary | Aug. 17, 1948 |

FOREIGN PATENTS

| Number | Country | Date |
| --- | --- | --- |
| 760,182 | France | Dec. 6, 1933 |
| 684,781 | France | Mar. 24, 1930 |